US012746894B2

(12) United States Patent
Choi

(10) Patent No.: US 12,746,894 B2
(45) Date of Patent: Sep. 29, 2026

(54) FORCED BRAKING APPARATUS FOR A VEHICLE

(71) Applicant: Young Woo Choi, Incheon (KR)

(72) Inventor: Young Woo Choi, Incheon (KR)

( * ) Notice: Subject to any disclaimer, the term of this patent is extended or adjusted under 35 U.S.C. 154(b) by 356 days.

(21) Appl. No.: 18/411,688

(22) Filed: Jan. 12, 2024

(65) Prior Publication Data

US 2024/0239309 A1 Jul. 18, 2024

(30) Foreign Application Priority Data

Jan. 16, 2023 (KR) ........................ 10-2023-0005828

(51) Int. Cl.
*B60T 1/04* (2006.01)
*B60T 7/08* (2006.01)

(52) U.S. Cl.
CPC . *B60T 1/04* (2013.01); *B60T 7/08* (2013.01); *B60T 2201/022* (2013.01)

(58) Field of Classification Search
CPC .................................. B60T 1/04; B60B 39/12
See application file for complete search history.

(56) References Cited

U.S. PATENT DOCUMENTS

2013/0008972 A1* 1/2013 Lubinitsky .............. B29B 17/00
238/14
2019/0039584 A1* 2/2019 Reed ....................... B60B 39/04

FOREIGN PATENT DOCUMENTS

DE 102009044217 A1 * 2/2011 ................ B60T 1/04
KR 10-1991-0016643 A 11/1991
KR 10-1543559 B1 8/2015

* cited by examiner

*Primary Examiner* — Ernesto A Suarez
*Assistant Examiner* — Lillian T Nguyen
(74) *Attorney, Agent, or Firm* — Sughrue Mion, PLLC

(57) ABSTRACT

Provided is a forced braking apparatus for a vehicle for forcibly braking the vehicle, wherein the apparatus includes a discharge unit mounted on an upper portion of a wheel house and discharging a braking net to a tread of a tire, wherein the braking net discharged from the discharge unit wraps around the tread and forcibly brakes the tire by driving a drive wheel.

7 Claims, 8 Drawing Sheets

FORCED BRAKING APPARATUS FOR A VEHICLE

CROSS-REFERENCE TO RELATED APPLICATION

This application is based on and claims priority under 35 U.S.C. § 119 to Korean Patent Application No. 10-2023-0005828, filed on Jan. 16, 2023, in the Korean Intellectual Property Office, the disclosure of which is herein incorporated by reference in its entirety.

TECHNICAL FIELD

The present disclosure relates to a forced braking apparatus for a vehicle, and more specifically, to a forced braking device for a vehicle capable of preventing a major accident by forcing a vehicle that starts and accelerates suddenly to stop.

BACKGROUND

As is well known, sudden unintended acceleration (SUA) is a phenomenon in which a vehicle accelerates suddenly regardless of a driver's intention. As in the case where the throttle is fully opened (the accelerator is fully depressed), the sudden unintended acceleration refers to a symptom in which the engine RPM rises rapidly and the vehicle rushes.

The cause of sudden unintended acceleration has not yet been clearly identified, but it is presumed to be caused by driver manipulation errors, defects in vehicle electronic parts, and hacking.

Likewise, when sudden unintended acceleration occurs in a situation where a driver is not prepared at all, the driver will be shocked and unable to respond. Even when the hand brake or foot brake works late, the engine power is so strong that braking often fails and leads to major accidents.

A variety of technologies have been proposed to prevent this sudden unintended acceleration phenomenon.

For example, representative examples include technology that cuts off fuel supply to an engine when sudden unintended acceleration occurs, technology that automatically applies brakes, and technology that stops the engine by stopping the supply of fuel.

Since the sudden unintended acceleration phenomenon has not yet been clearly identified, no technology has been proposed to prevent the sudden unintended acceleration phenomenon itself. However, what the aforementioned related art has in common is technology that supports stopping a vehicle through follow-up measures when signs of sudden unintended acceleration are seen.

For this reason, in recent years, there has been a demand for technology to force a vehicle to stop safely without damaging surrounding parts when the vehicle starts and accelerates suddenly.

In particular, as the use of electronic parts increases and autonomous driving functions are added to recent vehicles, new possibilities of sudden unintended acceleration due to hacking are emerging. Accordingly, there is a demand for technology capable of independently braking a vehicle without being linked to the braking system presently applied to the vehicle.

Related Art Documents

Patent Documents (0001) Korean Patent Application Publication No. 10-1991-0016643 (published on Nov. 14, 1990)

(0002) Korean Patent No. 10-1543559 (published on Aug. 5, 2015)

SUMMARY

The present disclosure has been devised to address an issue associated with the related art. An aspect of the present disclosure is directed to providing a forced braking apparatus for a vehicle capable of preventing a major accident by forcing the vehicle to stop safely when the vehicle starts and accelerates suddenly.

An aspect of the present disclosure provides a forced braking apparatus for a vehicle for forcibly braking the vehicle, wherein the apparatus includes a discharge unit mounted on an upper portion of a wheel house and discharging a braking net to a tread of a tire, wherein the braking net discharged from the discharge unit wraps around the tread and forcibly brakes the tire by driving a drive wheel.

The discharge unit includes: a case having a discharge slit; an operation shaft rotatably coupled to both sides in the case; a braking net that is wound around an outer diameter of the operation shaft and wraps the tread of the tire for braking; an elastic portion connecting the operation shaft and the case to rotate the operation shaft with an elastically releasing force to discharge the braking net; a ratchet and pawl that maintain a wound state of the elastic portion and control the operation shaft to rotate only in one direction; and a solenoid switch that operates the pawl to allow rotation of the ratchet.

The braking net may include an elastic plate that is formed in a thin plate shape and has elastic force; and an outer skin wrapping an outer surface of the elastic plate.

The outer skin may be made of a non-slip material to prevent slipping when in close contact with the tread of the tire.

An embodiment of the present disclosure may further include an operation button capable of being manipulated by a driver to operate the discharge unit.

According to an embodiment of the present disclosure, a vehicle is braked by stopping the tires by pressing the operation button when the vehicle starts and accelerates suddenly, so the apparatus is not linked to the existing braking system applied to the vehicle and can brake the vehicle independently. As the use of electronic parts increases and autonomous driving functions are added, the apparatus can be applied to vehicles where new possibilities of sudden unintended acceleration due to hacking are emerging, so as to effectively respond to hacking. In addition, there is a very useful benefit of being able to brake the vehicle by pressing the operation button when the vehicle may not be braked due to wear of the brake disc or brake pads or malfunction of the brake system.

DETAILED DESCRIPTION

Figure 1:
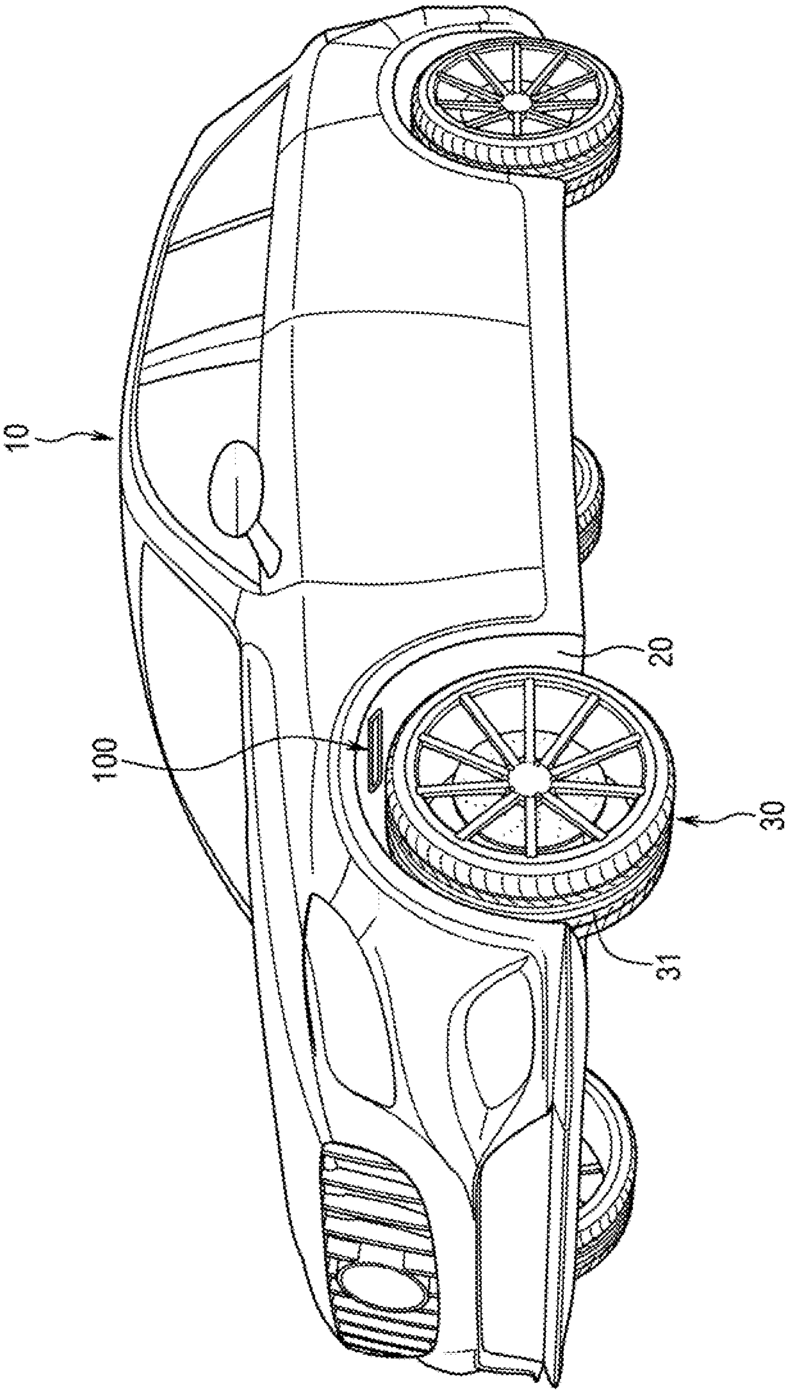
FIG. 1 is a perspective view according to an embodiment of the present disclosure.

Hereinafter, in order to fully understand the present disclosure, preferred embodiments of the present disclosure will be described below with reference to the attached drawings.

Embodiments of the present disclosure can be modified in various forms, such as dropping a braking net fixed with a hook on an upper end of a wheel, and the scope of the present disclosure should not be construed as limited to the embodiments described in detail below. This embodiment is provided to more completely explain the present disclosure to those having ordinary skill in the art.

Accordingly, the shapes of constituents illustrated in the drawings may be exaggerated to emphasize a clearer explanation, and it should be noted that the same reference numerals may denote the same elements in each drawing.

Additionally, the detailed descriptions of well-known functions and configurations that are determined to unnecessarily obscure the gist of the present disclosure may be omitted.

A forced braking apparatus for a vehicle according to an embodiment of the present disclosure includes: a braking net 130 formed to wrap a tread 31 of a tire 30; a discharge unit 100 for discharging the braking net 130 to the tread 31 of the tire 30; and an operation button 200 for operating the discharge unit 100.

FIG. 1 is a perspective view according to an embodiment of the present disclosure.

Referring to FIG. 1, the discharge unit 100 is mounted on a rear upper portion of a wheel house 20 covering a drive wheel.

Figure 2:
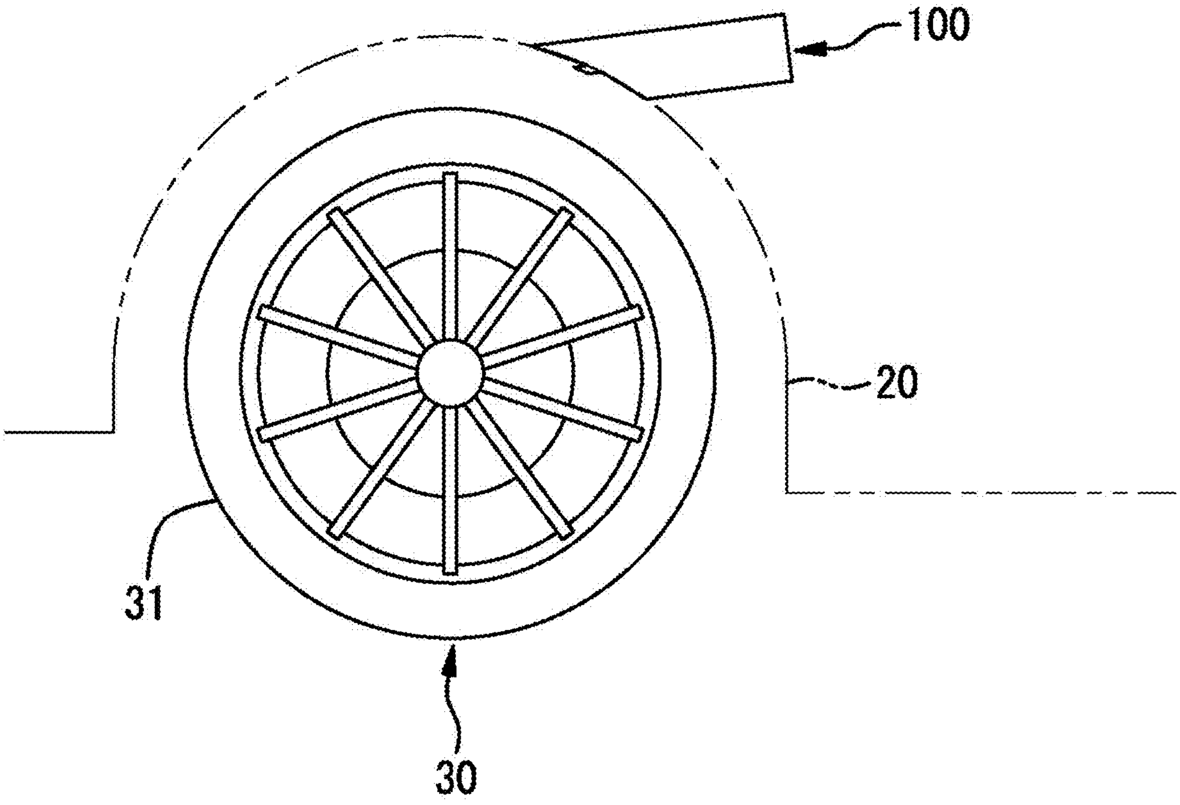
FIG. 2 is a side view of a recess portion according to an embodiment of the present disclosure.

FIG. 2 is a side view of a recess portion according to an embodiment of the present disclosure.

Referring to FIG. 2, the discharge unit 100 is mounted on the wheel house 20 inclined downward toward the tire 30.

Figure 3:
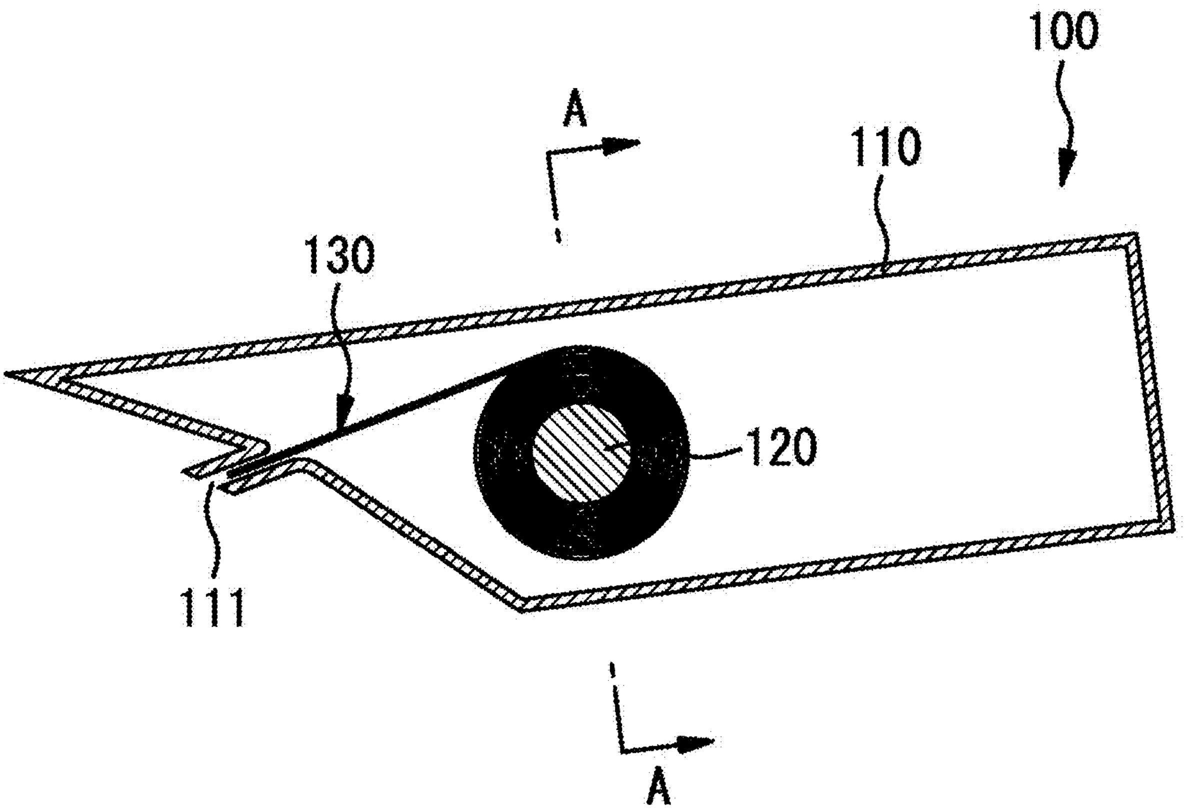
FIG. 3 is a cross-sectional view of a discharge unit according to an embodiment of the present disclosure.

FIG. 3 is a cross-sectional view of the discharge unit 100 according to an embodiment of the present disclosure.

Referring to FIG. 3, the discharge unit 100 includes: a case 110 having a discharge slit 111 on a front surface thereof; an operation shaft 120 rotatably coupled to both sides in the case 110; and the braking net 130 that is wound around an outer diameter of the operation shaft 120 and wraps the tread 31 of the tire 30 for braking.

The discharge slit 111 is provided on a front surface of the case 110 so that the front end of the braking net 130 may be discharged. The case 110 is firmly fixed to a vehicle body (not shown) or frame (not shown) through a bracket (not shown) to firmly hold the braking net 130.

The front end of the braking net 130 is disposed in the discharge slit 111 of the case 110, and the rear end is fixed to the operation shaft 120.

Figure 4:
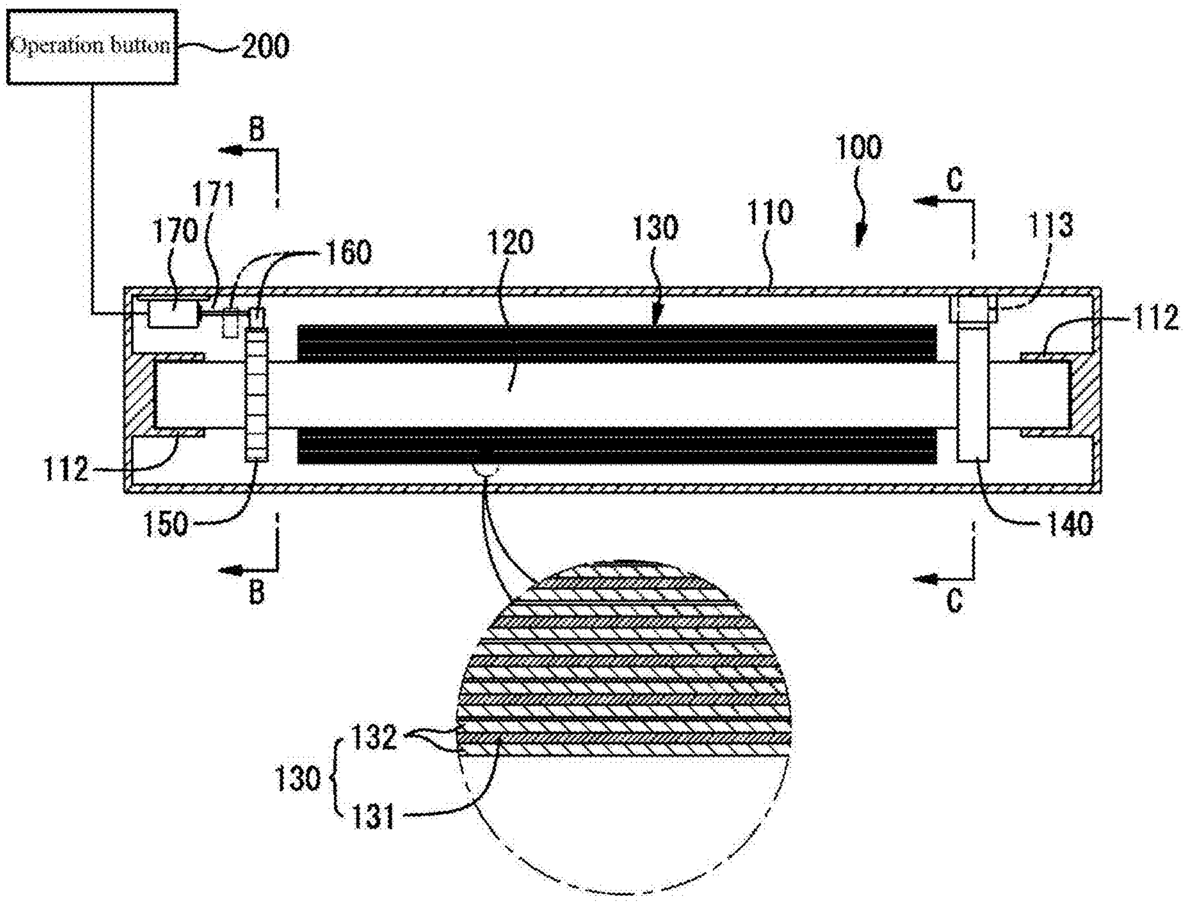
FIG. 4 is a cross-sectional view taken along line A-A of FIG. 3.

FIG. 4 is a cross-sectional view taken along line A-A of FIG. 3.

Referring to FIG. 4, the discharge unit 100 includes: an elastic portion 140 that connects the operation shaft 120 and the case 110 to rotate the operation shaft 120 with an elastic release force to discharge the braking net 130; and a switch portion that allows rotation of the operation shaft 120.

Bosses 112 are provided on both inner surfaces of the case 110, so that both ends of the operation shaft 120 are rotatably coupled.

The switch portion is connected to the operation shaft to prevent the operation shaft from rotating when the elastic portion is deformed other than at an intended point in time.

For example, when the switch portion is in a first position, a ratchet 150 and a pawl 160 of the switch portion are fastened to each other, so that the operation shaft may rotate only in a backward direction and may not rotate in a forward direction. Thus, the elastic portion 140 may be maintained in an elastically deformed state.

For example, when the switch portion is in a second position, the ratchet 150 and the pawl 160 of the switch portion are spaced apart from each other, so that the operation shaft may rotate in the forward and backward directions.

Specifically, the switch portion includes: the ratchet 150 and the pawl 160 that maintains a wound state of the elastic portion and controls rotation of the operation shaft 120 only in one direction; and a solenoid switch 170 that operates the pawl 160 to allow rotation of the ratchet 150.

For example, the intended point in time may mean a point in time when a driver presses the operation button to operate the discharge unit.

For example, the intended point in time may be a point in time when a vehicle 10 suddenly accelerates.

Referring to the enlarged view illustrated in the lower portion of FIG. 4, the braking net 130 includes an elastic plate 131 that is formed in a thin plate shape and has elastic force, and an outer skin 132 wrapping an outer surface of the elastic plate 131.

The elastic plate 131 is formed in a thin plate shape made of metal or synthetic resin to have the same or similar width as the tread 31 of the tire 30 and maintains the elastic force and die clamping force of the braking net 130.

The outer skin 132 is made of a non-slip material to prevent slipping when in close contact with the tread 31.

This braking net 130 is formed into a net shape through press processing while the outer surface of the elastic plate 131 is wrapped with the outer skin 132.

Figure 6:
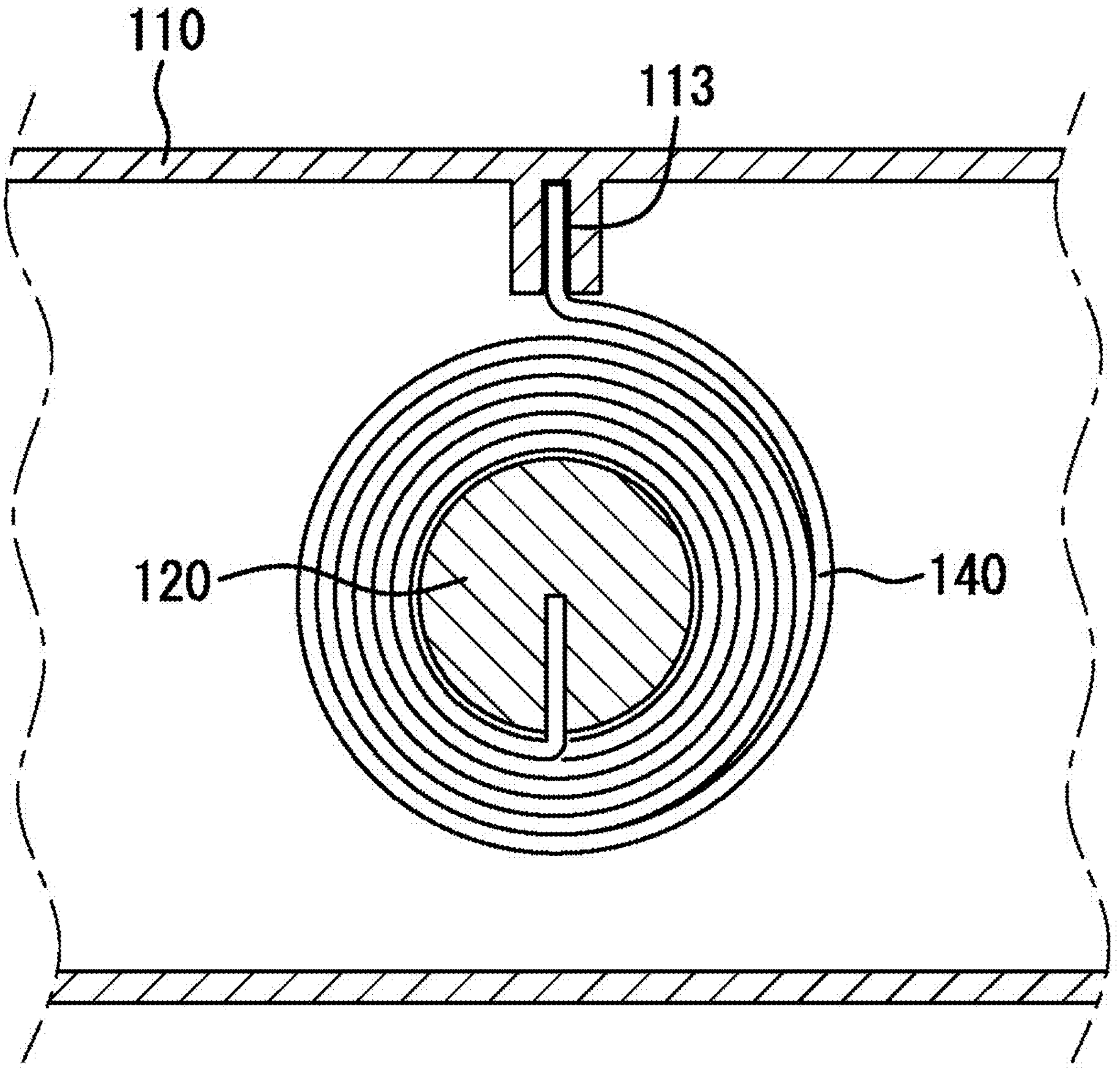
FIG. 6 is an enlarged cross-sectional view taken along line C-C of FIG. 4.

Referring to FIG. 6, which shows an enlarged cross-sectional view taken along line C-C of FIG. 4, the inner end of the elastic portion 140 is wound and fixed to an outer diameter of the right end of the operation shaft 120, and the outer end thereof is coupled and fixed to a coupling groove 113 provided in the case 110.

This elastic portion 140 accumulates the elastic energy of the metal plate when wound around the operation shaft 120, and rotates the operation shaft 120 to discharge the braking net 130 by using the force to be released to its original state as power.

The elastic portion 140 may be made of an elastic material.

For example, the elastic portion 140 may be a spiral spring.

However, the types of the elastic portion 140 may be modified in various ways that are obvious to those skilled in the art, without being limited thereto.

Figure 5:
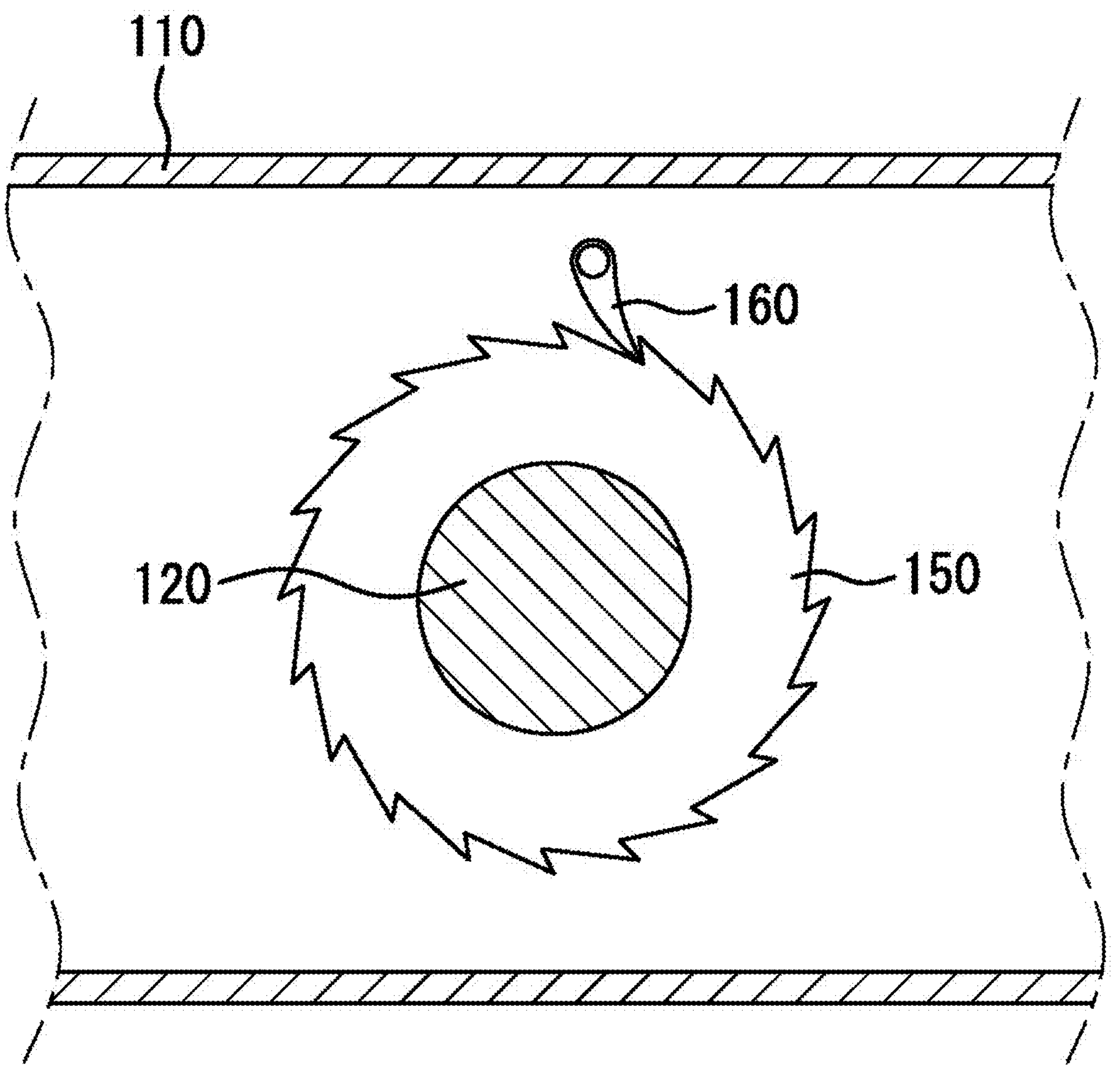
FIG. 5 is an enlarged cross-sectional view taken along line B-B of FIG. 4.

Referring to FIG. 5, which shows an enlarged cross-sectional view taken along line B-B of FIG. 4, the ratchet 150 is fixed to a left end of the operation shaft 120.

In addition, the ratchet 150 transmits rotation only to the rear of the case 110 by the operation of the pawl 160 and does not transmit movement in the direction where the discharge slit 111 is located.

In other words, the ratchet 150 and the pawl 160 prevent the operation shaft 120 from rotating toward the front of the case 110 where the discharge slit 111 is located.

Referring to FIG. 4, the solenoid switch 170 is mounted inside the case 110 to operate the pawl 160 that controls the rotation of the ratchet 150.

A plunger 171 of the solenoid switch 170 is connected to one side of the pawl 160 so that the pawl 160 moves in an axial direction of the operation shaft 120.

In detail, the solenoid switch 170 operates the pawl 160 to control rotation of the ratchet 150 (solid line in FIG. 4, first position of the switch portion) or operates and moves the pawl 160 to allow rotation of the ratchet 150 (double-dotted line in FIG. 4, second position of the switch portion).

This solenoid switch 170 is operated by the operation button 200 installed on a dashboard (not shown) of the vehicle 10.

The action of an embodiment of the present disclosure configured as described above will be described in detail with reference to the attached drawings as follows.

First, when the vehicle 10 detects sudden acceleration regardless of an intention of a driver, the driver quickly presses the operation button 200.

In this connection, an engine RPM of the vehicle 10 rises rapidly as if the throttle is fully opened and the vehicle 10 rushes forward.

Subsequently, the solenoid switch 170 operates the plunger 171 by an operation signal input from the operation button 200 and moves the pawl 160 to allow rotation of the ratchet 150.

Then, the operation shaft 120 rotates in the direction of the discharge slit 111 by the releasing force of the elastic portion 140, which has accumulated elastic energy, to discharge the braking net 130.

Figure 7:
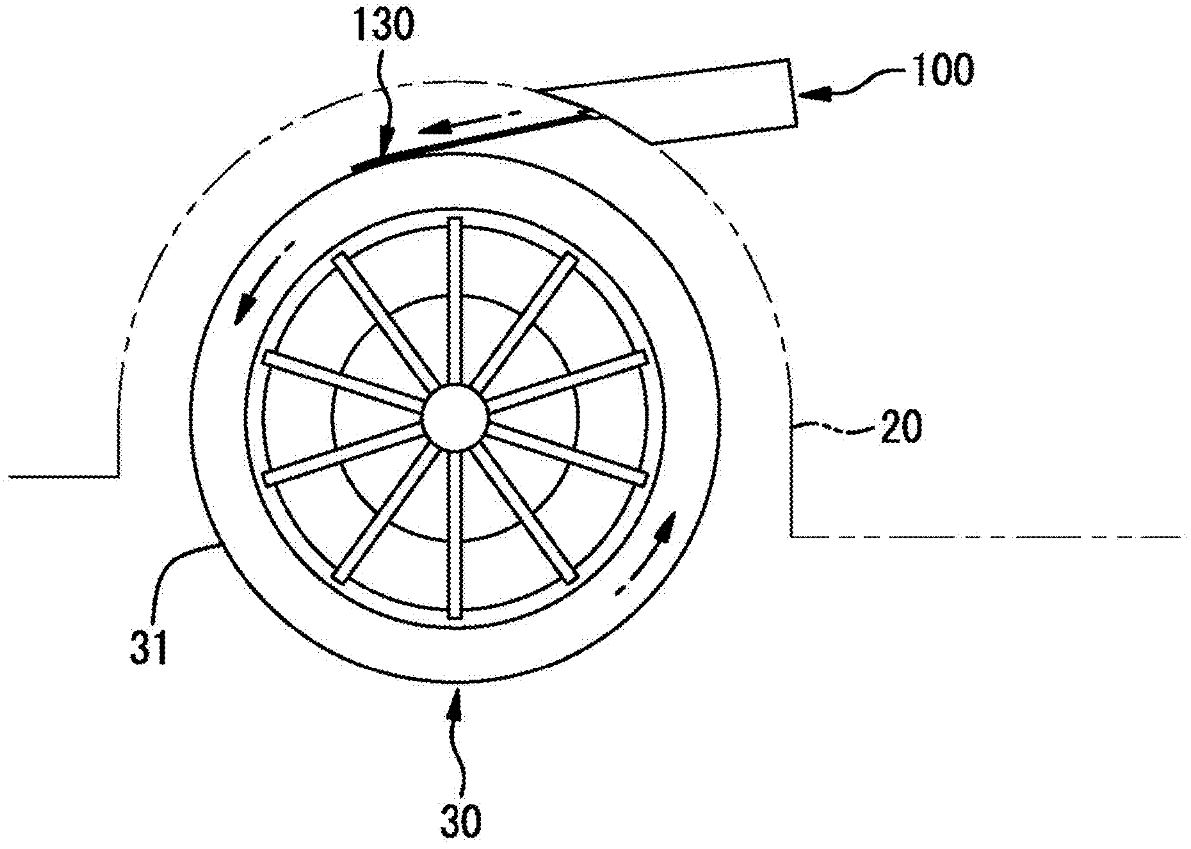
FIGS. 7 and 8 are operation views according to an embodiment of the present disclosure.

Next, the braking net 130 discharged from the discharge unit 100 is in close contact with the tread 31 of the tire 30, as illustrated in FIG. 7.

Figure 8:
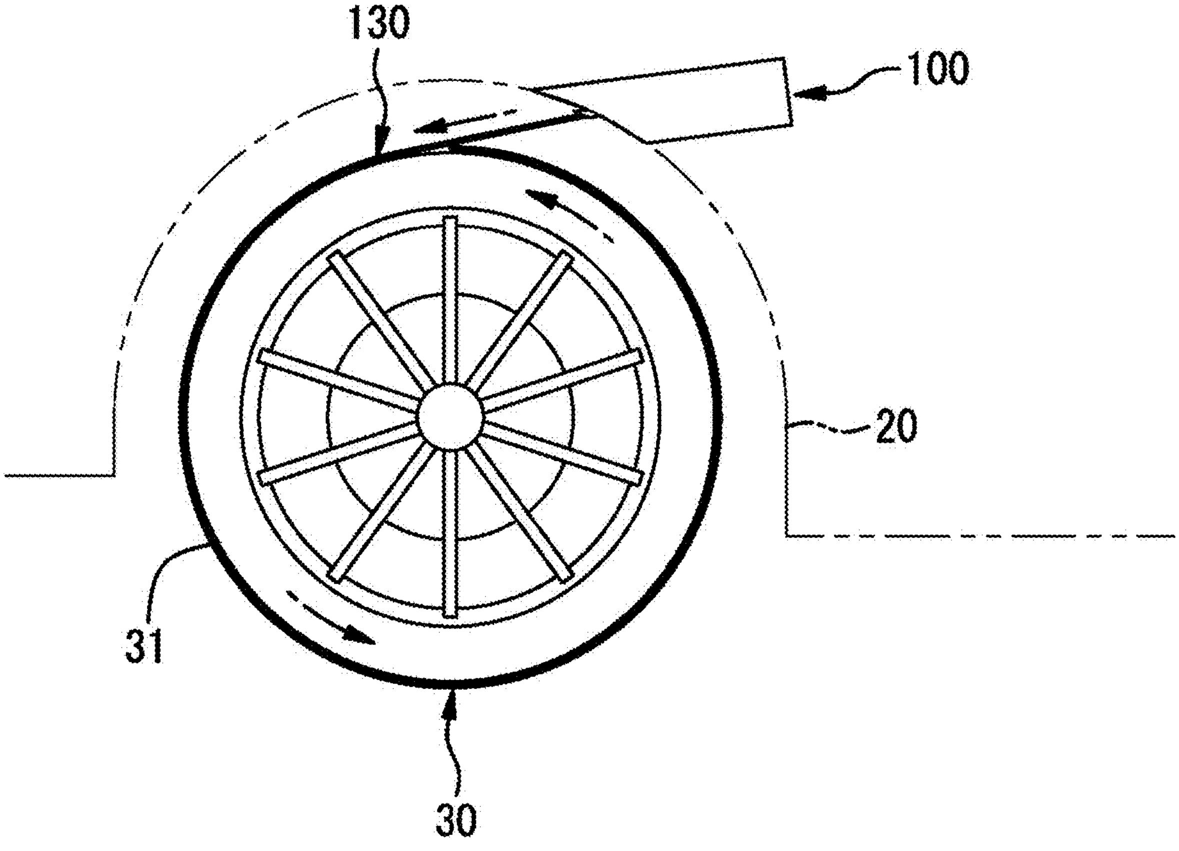

In this connection, since the tire 30 is rotating at high speed, the braking net 130 quickly wraps around the tread 31, as illustrated in FIG. 8.

In this way, the tire 30 is stopped by the braking net 130 wrapping around the tread 31.

According to the aforementioned embodiment of the present disclosure, when the vehicle 10 suddenly starts and accelerates, the operation button 200 is pressed to stop the tires 30 to brake the vehicle 10, so that the apparatus is not linked to the existing brake system applied to the vehicle 10 and may brake the vehicle 10 independently.

In addition, according to the aforementioned embodiment of the present disclosure, as the use of electronic parts increases and autonomous driving functions are added, the apparatus may be applied to the vehicle 10 where new possibilities of sudden unintended acceleration due to hacking are emerging, so as to effectively respond to hacking.

In addition, according to the aforementioned embodiment of the present disclosure, there is a very useful benefit of being able to brake the vehicle 10 by pressing the operation button 200 when the vehicle 10 may not be braked due to wear of the brake disc or brake pads or malfunction of the brake system.

The meaning of the term "sudden unintended acceleration" can include "sudden start-and-acceleration".

The embodiments of the present disclosure described above are merely illustrative, and those skilled in the art will understand that various modifications and equivalent other embodiments are possible therefrom.

Accordingly, it will be well understood that the present disclosure is not limited to the forms mentioned in the detailed description above.

Accordingly, the true scope of technical protection of the present disclosure should be determined by the technical spirit of the appended claims, and the present disclosure should be understood to include the technical spirit defined by the appended claims and all modifications, equivalents and substitutes within the scope thereof.

What is claimed is:

1. A forced braking apparatus for a vehicle for forcibly braking the vehicle, the apparatus comprising:

a discharge unit mounted on a wheel house and discharging a braking net to a tread of a tire, wherein the braking net wraps around the tread and forcibly brakes the tire, wherein the discharge unit comprises:

a case having a discharge slit;

an operation shaft rotatably coupled to both sides in the case;

the braking net that is wound around an outer diameter of the operation shaft and wraps the tread of the tire for braking;

an elastic portion connecting the operation shaft and the case to rotate the operation shaft with an elastically releasing force to discharge the braking net; and a switch portion connected to the operation shaft to prevent the operation shaft from rotating when the elastic portion is deformed other than at an intended point in time.

2. The apparatus of claim 1, wherein the discharge unit is mounted on a rear upper portion of the wheel house.

3. The apparatus of claim 1, wherein the elastic portion is a spiral spring.

4. The apparatus of claim 3, wherein the switch portion comprises:

a ratchet and pawl that maintain a wound state of the elastic portion and control the operation shaft to rotate only in one direction; and a solenoid switch that moves the pawl to allow rotation of the ratchet.

5. The apparatus of claim 1, wherein the braking net comprises:

an elastic plate that is formed in a thin plate shape and has elastic force; and an outer skin wrapping an outer surface of the elastic plate.

6. The apparatus of claim 5, wherein the outer skin is made of a non-slip material to prevent slipping when in close contact with the tread of the tire.

7. The apparatus of claim 1, further comprising an operation button capable of being manipulated by a driver to operate the discharge unit.

* * * * *